(12) United States Patent
Sugita et al.

(10) Patent No.: US 10,303,106 B2
(45) Date of Patent: May 28, 2019

(54) DRIVING DEVICE AND IMAGE FORMING APPARATUS

(71) Applicants: Narumi Sugita, Kanagawa (JP); Masahiro Ishida, Kanagawa (JP)

(72) Inventors: Narumi Sugita, Kanagawa (JP); Masahiro Ishida, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 15/977,298

(22) Filed: May 11, 2018

(65) Prior Publication Data

US 2018/0259896 A1 Sep. 13, 2018

Related U.S. Application Data

(63) Continuation of application No. 15/236,938, filed on Aug. 15, 2016, now Pat. No. 10,001,741, which is a (Continued)

(30) Foreign Application Priority Data

Jun. 23, 2014 (JP) .................................. 2014-128395

(51) Int. Cl.
*F16H 57/00* (2012.01)
*F16H 57/12* (2006.01)
(Continued)

(52) U.S. Cl.
CPC ....... *G03G 15/757* (2013.01); *F16H 57/0006* (2013.01); *F16H 57/12* (2013.01);
(Continued)

(58) Field of Classification Search
CPC .................................................. G03G 15/757
(Continued)

(56) References Cited

U.S. PATENT DOCUMENTS 5,809,380 A * 9/1998 Katakabe ........... G03G 15/0194
399/167
6,400,914 B1 * 6/2002 Noda ...................... F16D 1/101
399/111
(Continued)

FOREIGN PATENT DOCUMENTS

JP H05-088101 A 4/1993
JP 9-230658 A 4/1996
(Continued)

OTHER PUBLICATIONS

Office Action for corresponding Japanese Application No. 2014-128395 dated Mar. 9, 2018.
(Continued)

*Primary Examiner* — Clayton E. LaBalle
*Assistant Examiner* — Kevin C Butler
(74) *Attorney, Agent, or Firm* — Harness, Dickey & Pierce, P.L.C.

(57) ABSTRACT

Example embodiments include a driving device having: a plurality of vibrating members that may vibrate when the vibrating members are driven; and a holding part that may hold the vibrating members. The holding part may include a first member with which one or more of the vibrating members may be brought into contact, and a second member with which one or more of the vibrating members may be brought into contact. The first member and the second member may be partially coupled to each other. A grounding member for electrically grounding a member held by the holding part may be brought into contact with one of the first member and the second member that is more difficult to vibrate.

13 Claims, 11 Drawing Sheets

Related U.S. Application Data continuation of application No. 14/744,806, filed on Jun. 19, 2015, now Pat. No. 9,447,862.

(51) Int. Cl.
*G03G 15/00* (2006.01)
*G03G 15/01* (2006.01)
*G03G 21/16* (2006.01)
*G03G 21/18* (2006.01)

(52) U.S. Cl.
CPC ..... *G03G 15/5008* (2013.01); *G03G 21/1647* (2013.01); *G03G 21/1857* (2013.01); *F16H 2057/123* (2013.01); *G03G 15/0178* (2013.01); *G03G 2215/0119* (2013.01); *G03G 2221/1657* (2013.01); *Y10T 74/19623* (2015.01)

(58) Field of Classification Search
USPC ............................................. 399/167
See application file for complete search history.

(56) References Cited

U.S. PATENT DOCUMENTS

| | | | | |
|---|---|---|---|---|
| 8,903,277 B2* | 12/2014 | Ishida | ............... | B41J 23/025 399/167 |
| 2005/0111870 A1* | 5/2005 | Zogg | ............... | G03G 15/751 399/90 |
| 2005/0141921 A1* | 6/2005 | Baek | ............... | G03G 15/0896 399/167 |
| 2008/0213000 A1* | 9/2008 | Funamoto | ............... | G03G 15/0131 399/167 |
| 2009/0179513 A1* | 7/2009 | Cho | ............... | G03G 15/757 310/91 |
| 2009/0190956 A1* | 7/2009 | Carter | ............... | G03G 15/0126 399/167 |
| 2011/0243611 A1* | 10/2011 | Kawashima | ............... | G03G 15/757 399/167 |
| 2011/0318059 A1* | 12/2011 | Saito | ............... | G03G 21/16 399/167 |
| 2012/0027464 A1* | 2/2012 | Kobayashi | ............... | G03G 15/0189 399/167 |
| 2012/0213544 A1* | 8/2012 | Ooyoshi | ............... | G03G 15/751 399/90 |
| 2013/0216262 A1* | 8/2013 | Miyagawa | ............... | F16F 7/104 399/167 |
| 2014/0064752 A1* | 3/2014 | Tsuji | ............... | G03G 15/55 399/36 |
| 2015/0241834 A1* | 8/2015 | Nakamura | ............... | G03G 15/757 399/167 |
| 2015/0277337 A1* | 10/2015 | Ishida | ............... | G03G 15/757 399/167 |
| 2015/0369338 A1* | 12/2015 | Sugita | ............... | F16H 1/10 399/167 |
| 2015/0370214 A1* | 12/2015 | Ishida | ............... | G03G 21/1647 399/167 |
| 2015/0370215 A1* | 12/2015 | Sugita | ............... | F16H 57/12 399/167 |

FOREIGN PATENT DOCUMENTS

| | | | |
|---|---|---|---|
| JP | H-09-230658 A | | 9/1997 |
| JP | 2003057901 A | | 2/2003 |
| JP | 2003166623 A | | 6/2003 |
| JP | 2007003964 A | | 1/2007 |
| JP | 2007155822 A | | 6/2007 |
| JP | 2009164668 A | | 7/2009 |
| JP | 2016027271 | * | 2/2016 ............... F16H 1/08 |

OTHER PUBLICATIONS

Japanese Office Action dated Jul. 13, 2018 issued in corresponding Japanese Application No. 2014-128395 (with translation).

* cited by examiner

DRIVING DEVICE AND IMAGE FORMING APPARATUS

CROSS-REFERENCE TO RELATED APPLICATIONS

This is a continuation of U.S. application Ser. No. 15/236,938, filed on Aug. 15, 2016, which is a continuation of U.S. application Ser. No. 14/744,806, filed on Jun. 19, 2015, which claims priority to and incorporates by reference the entire contents of Japanese Patent Application No. 2014-128395 filed in Japan on Jun. 23, 2014, the entire contents of each of which are incorporated herein by reference thereto.

BACKGROUND

1. Field of the Invention

Example embodiments relate to a driving device and an image forming apparatus.

2. Description of the Related Art

An image forming apparatus provided to a copier, a printer, a facsimile, and a multifunction peripheral including the functions of a copier, a printer, and a facsimile have many driving devices to perform image forming operations. Such driving devices are used in operating a photoconductor, a transfer belt, and the like. In such an image forming apparatus including driving devices, problematic noise is generated in the image forming operations. In image forming apparatuses, many components are mechanically connected to one another, a driving force from the driving device is transmitted to such components, and noise is generated due to vibrations of the components and or the like. To reduce such noise, many inventions have been invented.

Japanese Patent Application Laid-open No. 2009-164668 discloses an invention for preventing vibrations related to a driving device in an image reading unit included in an image forming apparatus. As illustrated in FIG. 12, a motor 200 that is a driving device is fixed to a support plate 201 with motor fixing screws 202. The support plate 201 is fixed to a housing, not illustrated, with three support plate fixing screws 204, with vibration insulating members 203 interposed between the housing and the respective support plate fixing screws 204. A drive output gear, not illustrated, and a driving pulley 206 are provided on the side of the support plate 201 rear with respect to the side on which the motor 200 is mounted. The driving force of the motor 200 is transmitted to the driving pulley 206 via the drive output gear, and the driving pulley 206 transmits the driving force to a belt 207. The support plate 201 also includes an inclination adjustment screw 210 for adjusting the inclination of the support plate 201, such an adjustment made by adjusting how tightly the screw is fastened. In this manner, the support plate 201 is prevented from being inclined with respect to the housing. This prevents increase of the vibration due to worse engagement with the belt 207 caused by the position shift of the driving pulley 206, and/or the like.

Japanese Patent Application Laid-open No. 2007-3964 discloses, because humans tend to feel more uncomfortable with high-frequency sound, an image forming apparatus that makes high-frequency sound less audible by classifying the vibrations generated inside the image forming apparatus into high-frequency sound and low-frequency sound, and increasing the level of the low-frequency sound so that the low-frequency sound is less audible. Japanese Patent Application Laid-open No. 2007-3964 also discloses a technology for reducing the noise itself in the apparatus, by making the motor movement smoother by reducing the step angle of the motor, or by providing a sound absorber to a wall so that the sound generated internal of the wall is absorbed by the sound absorber.

Countermeasures for the noise in the image forming apparatus have been implemented, including those using a vibration absorber and a sound absorber, and making high-frequency sound less audible, as disclosed in Japanese Patent Application Laid-open No. 2009-164668 and Japanese Patent Application Laid-open No. 2007-3964, for example, and have succeeded in removing the noise to some extent. These countermeasures are, however, not always effective because there are many different types of image forming apparatuses, and the image forming apparatuses have many driving devices that use different mechanisms. Furthermore, from the viewpoint of further reducing the noise level, it is more preferable to have many countermeasures for coping with the noise for different types of image forming apparatuses.

In view of the above, there is a need to provide a driving device and an image forming apparatus capable of coping with the noise easily and in a manner different from those explained above.

SUMMARY

It is an object of example embodiments to at least partially solve the problems in the conventional technology.

Example embodiments relate to a driving device including: a plurality of vibrating members that vibrate when the vibrating members are driven; and a holding part that holds the vibrating members. The holding part may include a first member with which one or more of the vibrating members may be brought into contact, and a second member with which one or more of the vibrating members may be brought into contact. The first member and the second member may be partially coupled to each other. A grounding member for electrically grounding a member held by the holding part may be brought into contact with one of the first member and the second member that is more difficult to vibrate.

Example embodiments relate to a driving device including one or a plurality of vibrating members that may vibrate when the vibrating members are driven; and a holding part that may hold the vibrating members. The holding part may include a first member and a second member with which at least one or more of the vibrating members may be brought into contact. The first member and the second member may be overlapped with each other, and may be partially coupled to each other. The first member and the second member may be coupled at three or more coupled portions. The vibrating members may abut against the first member and the second member inside a polygon formed by connecting the coupled portions.

The above and other objects, features, advantages and technical and industrial significance of this invention will be better understood by reading the following detailed description of presently preferred embodiments of the invention, when considered in connection with the accompanying drawings.

DETAILED DESCRIPTION OF EXAMPLE EMBODIMENTS

Figure 1:
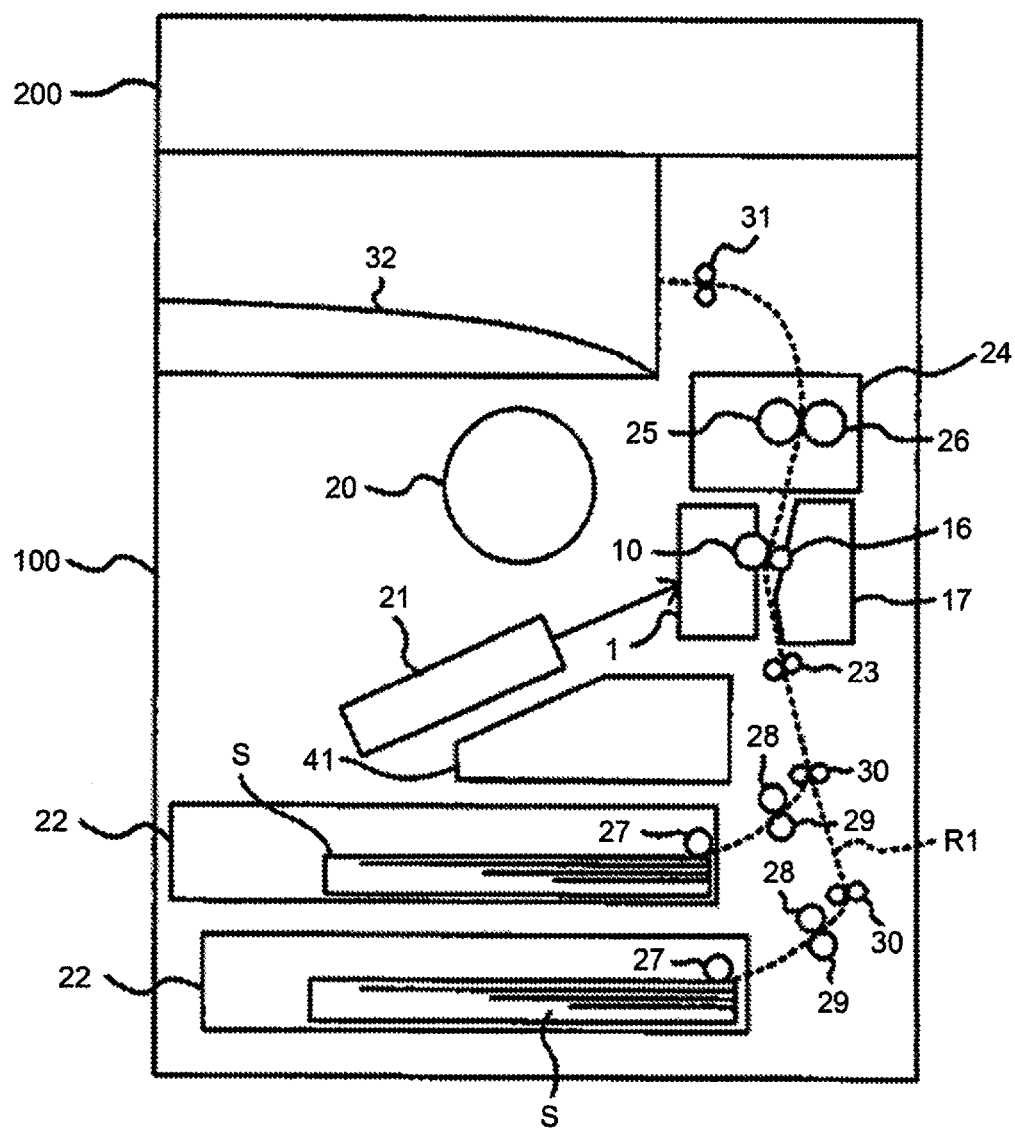
FIG. 1 is a schematically illustrating an image forming apparatus according to an example embodiment.

FIG. 1 is a schematic of an image forming apparatus according to an example embodiment.

On a copier that is the image forming apparatus, an image reading device 200 is mounted on a main unit 100.

A process cartridge 1 is provided inside the main unit 100.

Figure 2A:
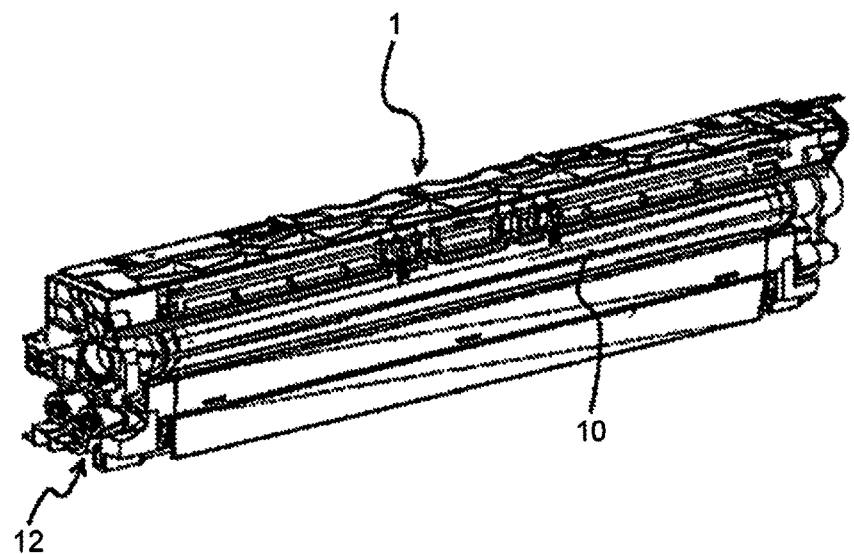
FIG. 2A is a perspective view of a process cartridge according to an example embodiment.
Figure 2B:
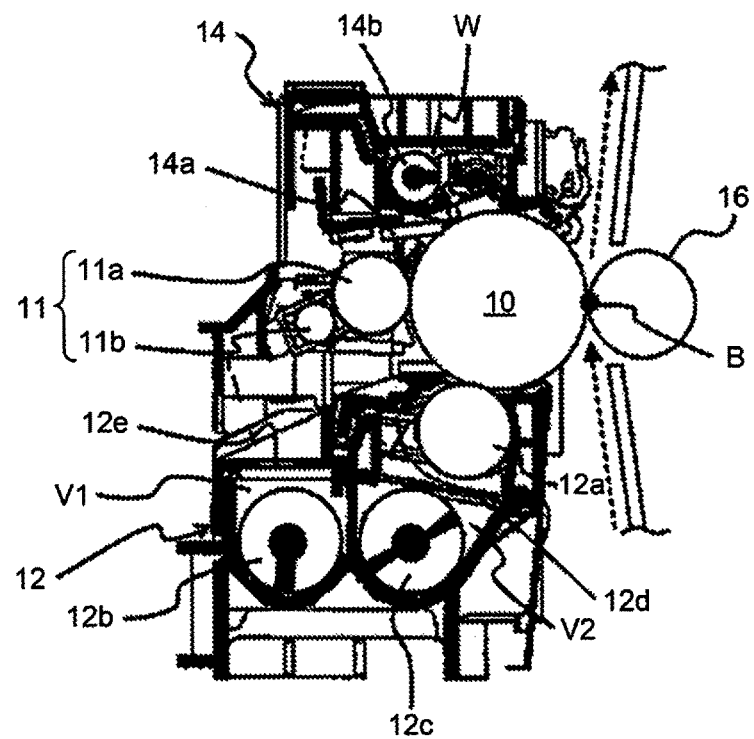
FIG. 2B is a cross-sectional view of the process cartridge according to an example embodiment.

FIG. 2A is a perspective view of the process cartridge. FIG. 2B is a cross-sectional view of the process cartridge.

As illustrated in FIG. 2B, the process cartridge 1 includes a photoconductor 10 that is a latent image bearer, a charging device 11 that is a processing unit disposed around the photoconductor 10 and acting on the photoconductor 10, a developing device 12, and a cleaning device 14. The process cartridge 1 is removably mounted on the main unit 100. The photoconductor 10, the charging device 11, developing device 12, and the cleaning device 14 are integrated as a process cartridge 1 so that the services, such as replacement and maintenance, can be carried out easily, and the positions of the respective members are kept at a highly accuracy so that the quality of images formed thereby can be improved.

The charging device 11 that is a charging unit includes a charging roller 11a to which the charging bias is applied and that charges the photoconductor 10 uniformly by applying an electric charge to the surface of the photoconductor 10, and a removing roller 11b that removes substances such as toner attached on the surface of the charging roller 11a.

The developing device 12 that is a developing unit includes a first developer container V1 in which a first conveying screw 12b that is a developer-conveying unit is disposed. The developing device 12 also includes a second developer container V2 in which a second conveying screw 12c that is another developer-conveying unit is disposed, a developing roller 12a that is a developer bearer, and a doctor blade 12d that is a developer controlling member.

These two developer containers V1 and V2 contain developer that is two-component developer containing magnetic carrier and negatively charged toner. The first conveying screw 12b is driven rotationally by a driving device, not illustrated, to convey the developer to the front in FIG. 2B in the first developer container V1. The developer conveyed by the first conveying screw 12b to the front end of the first developer container V1 in FIG. 2B enters the second developer container V2.

The second conveying screw 12c in the second developer container V2 is driven rotationally by a driving device not illustrated to convey the developer to the rear side in FIG. 2B. The developing roller 12a is disposed above the second conveying screw 12c, which conveys the developer in the manner described above, in an orientation parallel with the second conveying screw 12c. The developing roller 12a includes a magnet roller fixed inside a developing sleeve that is a non-magnetic sleeve driven rotationally.

Part of the developer conveyed by the second conveying screw 12c is attracted to the surface of the developing roller 12a by the magnetic force of the magnet roller, not illustrated, provided inside the developing roller 12a. The thickness of the developer on the surface of the developing roller 12a is controlled by the doctor blade 12d that is disposed with a predetermined space with respect to the surface of the developing roller 12a, and the developer is conveyed into a developing area facing the photoconductor 10. The developing roller 12a then applies the toner to the electrostatic latent image formed on the photoconductor 10. With this application of the toner, a toner image is formed on the photoconductor 10. The developer containing less toner, having toner consumed in the development, is then returned to the second conveying screw 12c as the surface of the developing roller 12a moves. The developer conveyed to the end of the second developer container V2 by the second conveying screw 12c is returned to the first developer container V1. In the manner described above, the developer is circulated in the developing device.

The developing device 12 also includes a toner concentration sensor that detects the toner concentration of the developer in the first developer container V1. The toner concentration sensor measures the toner concentration of the developer based on the magnetic permeability of the developer. When a toner concentration is low, the carrier that is magnetic body becomes more concentrated, and the magnetic permeability of the developer increases. When the measurement of the toner concentration sensor 124 exceeds a target level (threshold), toner is supplied from toner bottle 20 illustrated in FIG. 1 so that the toner concentration is controlled to a constant level. The target level is determined based on a detection result of an optical sensor detecting the amount of toner attached on a toner pattern formed on the photoconductor 10.

The toner concentration of the reference pattern on the photoconductor is controlled to a constant level through the process described above, but the reduction in the toner concentration cannot be controlled when the toner in the toner bottle 20 runs out. In such a case, the result of toner pattern detection from the optical sensor is not improved at all after the operation of supplying toner from the toner bottle 20 is performed for a predetermined time period. When the result of toner pattern detection from the optical sensor is not improved at all after the operation of supplying toner from the toner bottle 20 is performed, a unit not illustrated determines (or estimates) that the toner runs out (toner-end).

Once a toner-end is detected and the toner bottle 20 is replaced, a toner-end recovery operation for supplying the toner from the replaced toner bottle 20 into the developing device 12 is performed by rotating the developing roller 12a and the conveying screws 12b and 12c so that the supplied toner is thoroughly mixed with the developer. At this time, the photoconductor 10 is also driven rotationally to prevent the developer on the developing roller 12a from sliding unevenly.

The cleaning device 14 that is a cleaning unit includes a cleaning blade 14a that abuts against the surface of the photoconductor 10, and scrapes off the transfer residual toner attached on the photoconductor 10. The cleaning device 14 also includes a toner collection coil 14b that is housed in a collection unit W, and that conveys the toner collected by the cleaning blade 14a. The collected toner conveyed by the toner collection coil 14b is conveyed into the developing device 12 or a waste toner bottle 41 by a toner-conveying device not illustrated.

A transfer device 17 illustrated in FIG. 1 that is a transfer unit includes a transfer roller 16. The transfer roller 16 is pressed against and abuts against the circumferential surface of the photoconductor 10. A thermal fixing device 24 that is a fixing unit is provided above the transfer device 17. The thermal fixing device 24 includes a heating roller 25 and a pressing roller 26. The main unit 100 is provided with a laser writing device 21 that is a latent image forming unit. The laser writing device 21 includes a laser light source, a polygon mirror for scanning, a polygon motor, and an fθ lens. The main unit also includes a plurality of sheet cassettes 22 stacked on top of one another for storing therein sheets S such as transfer paper and overhead projector (OHP) films.

To make a copy using the image forming apparatus having such a structure, a user presses down a start switch not illustrated. The document placed on the image reading device 200 is read. At the same time, a photoconductor driving motor, not illustrated, rotates the photoconductor 10, and the charging device 11 uniformly charges the surface of the photoconductor 10 with the charging roller 11a. The laser writing device 21 then performs the writing by emitting a laser beam based on the image of the document read by the image reading device 200. After the electrostatic latent image is formed on the surface of the photoconductor 10, the developing device 12 turns an electrostatic latent image into a visible image (develops the electrostatic latent image) by applying toner to the image.

At the same time as the user presses down the start switch, a calling roller 27 sends the sheets S selected by a user from the sheet cassettes 22 that are stacked in multiple levels. A supplying roller 28 and a separating roller 29 separate one sheet S at a time, and feed the sheet S into a supply path R1. The sheet S sent into the supply path R1 is conveyed by sheet conveying rollers 30, and abuts against and stopped by registration rollers 23. At the timing synchronized with the visualized toner image on the photoconductor 10, the sheet S is fed into a transfer nip formed by the transfer roller 16 abutting against the photoconductor 10.

The transfer device 17 transfers the toner image on the photoconductor 10 onto the sheet S fed into the transfer nip. The cleaning device 14 then cleans the residual toner on the photoconductor 10 after the image transfer. The residual potential of the photoconductor 10 having the residual toner removed is neutralized by a neutralization device not illustrated, and the photoconductor 10 is prepared for the next image formation starting from the charging device 11.

The sheet S on which an image is transferred is guided into the thermal fixing device 24. The sheet S is passed between the heating roller 25 and the pressing roller 26, and has heat and pressure applied, while being conveyed by these rollers, and has the toner image fixed. The sheet S on which the image is fixed is ejected by paper ejection rollers 31 and stacked on a paper ejection stacking unit 32.

Characteristics of the present invention will now be explained.

Figure 3:
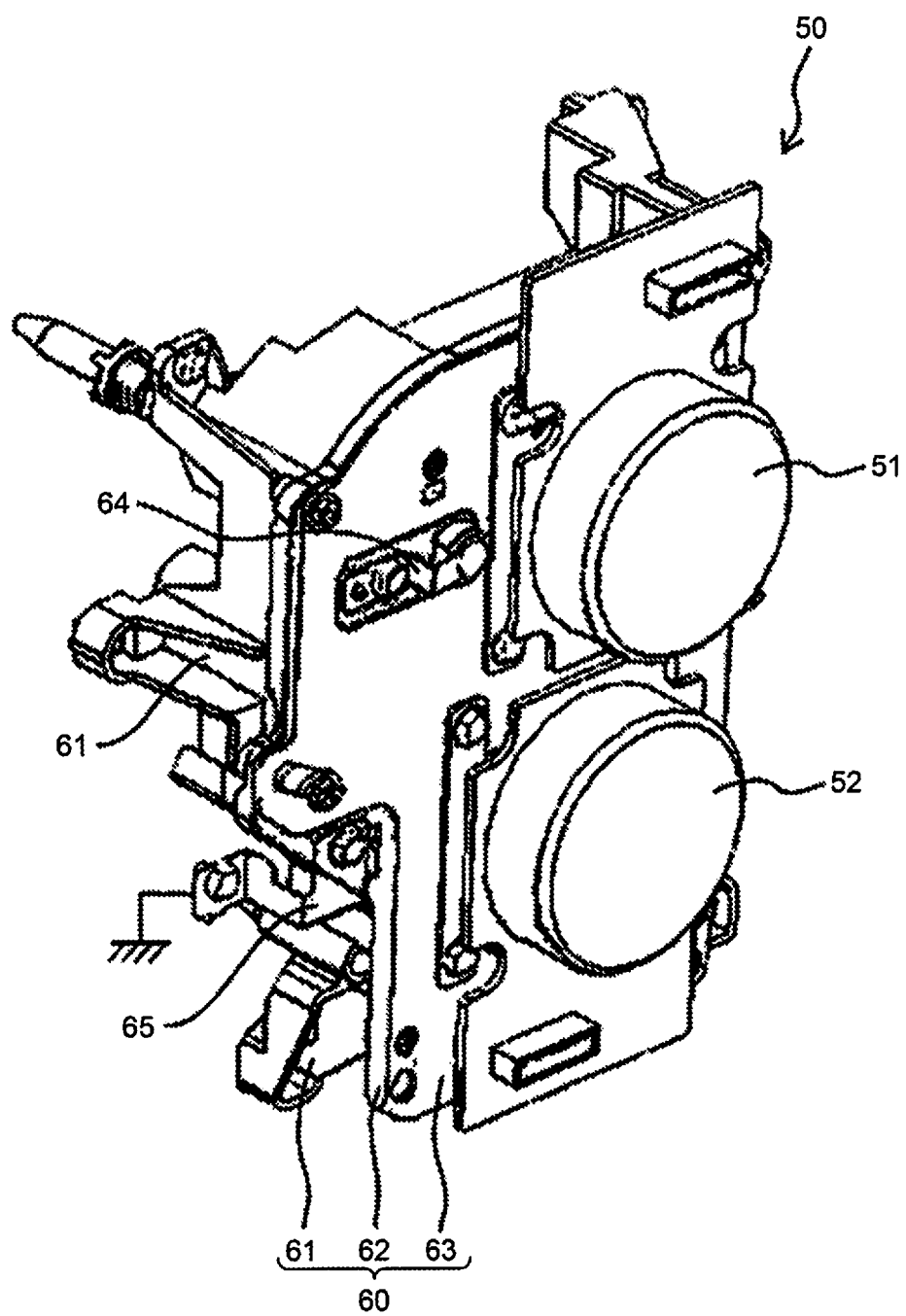
FIG. 3 is a perspective view of a driving device according to an example embodiment.
Figure 4:
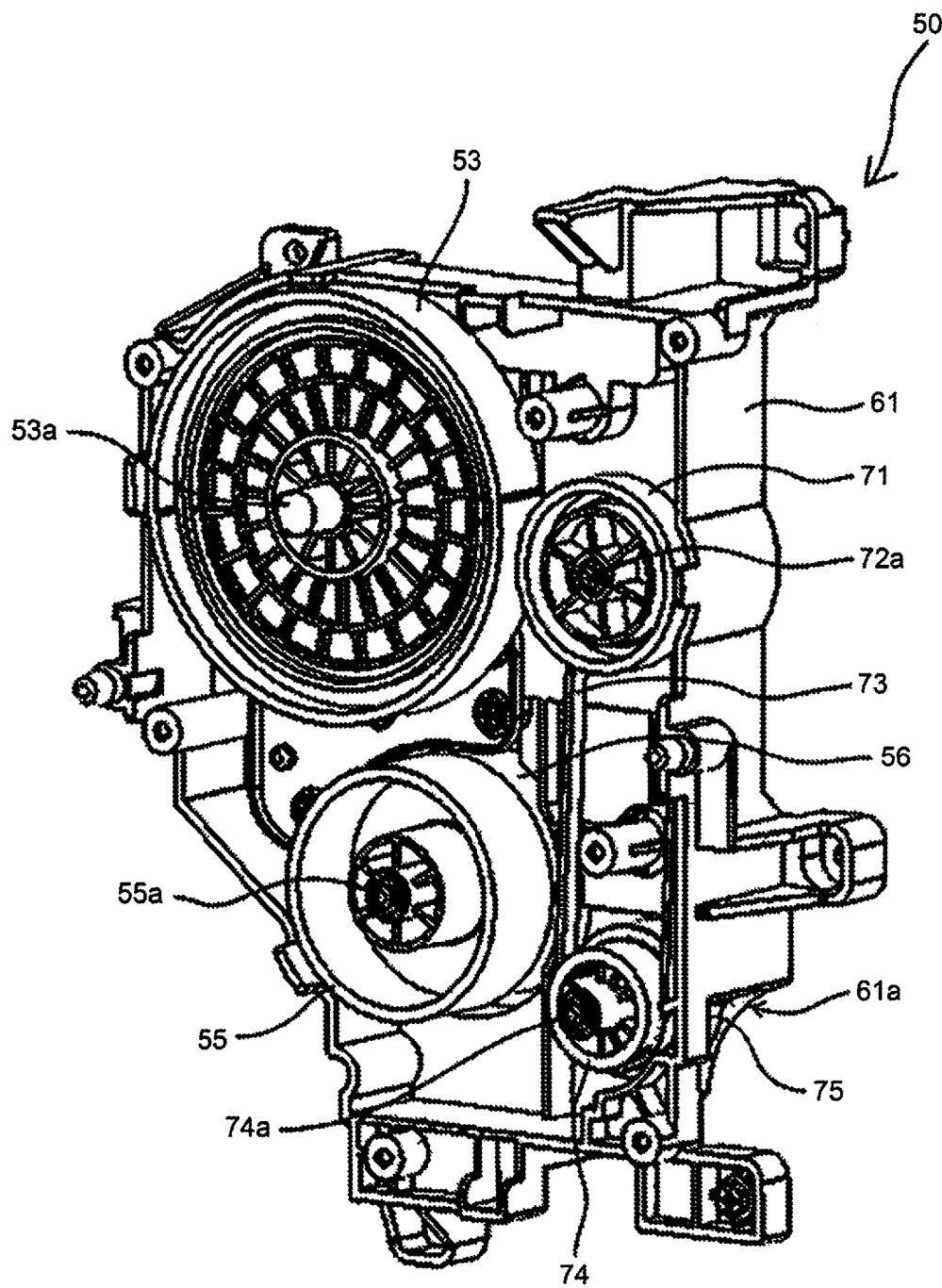
FIG. 4 is a perspective view illustrating the internal of the driving device.
Figure 5:
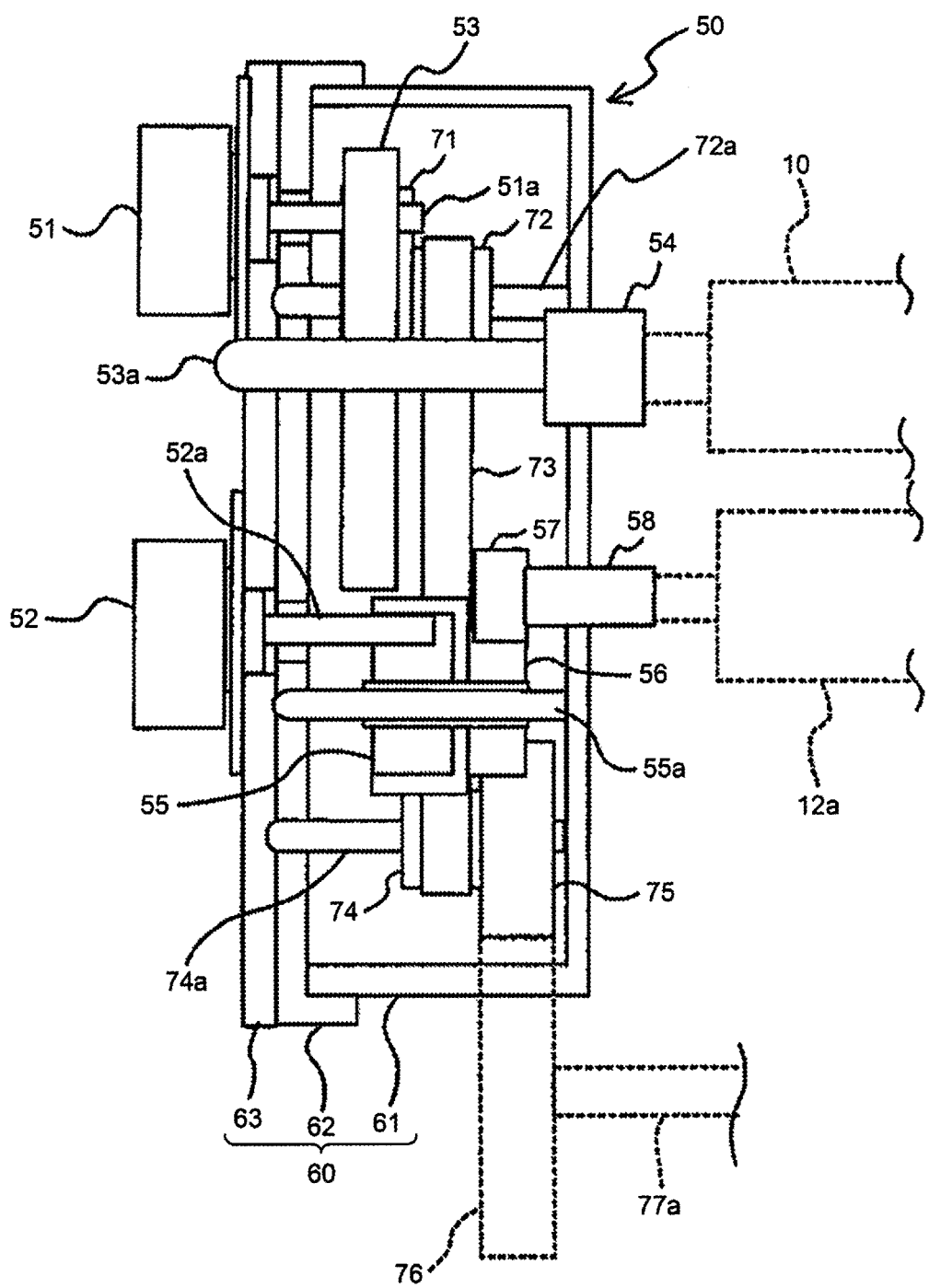
FIG. 5 is a schematic cross-sectional view of the driving device.

FIG. 3 is a perspective view of a driving device 50 for driving the photoconductor 10 and the developing roller, for example. FIG. 4 is a perspective view illustrating the internal of the driving device 50. FIG. 5 is a schematic cross-sectional view of the driving device 50.

The driving device 50 includes a holding part 60 for holding a photoconductor motor 51, a developing motor 52, and drive transmitting members such as gears for transmitting a driving force from each of these motors.

The holding part 60 includes a resin housing 61, a bracket 62 that is a first member made of metal, and a vibration controlling plate 63 that is a second member made of metal.

As illustrated in FIGS. 4 and 5, the resin housing 61 houses a photoconductor gear 53, a developing internal gear 55, a developing driven gear 56, and a developing idler gear 57. The resin housing 61 also houses members for transmitting a driving force to a waste toner conveying screw, not illustrated, that conveys the collected waste toner into the waste toner bottle toward the rear of the waste toner bottle 41. Specifically, the resin housing 61 houses a conveying driving gear 71, a conveying driving pulley 72, a conveying timing belt 73, a conveying driven pulley 74, and a conveying idler gear 75.

The photoconductor gear 53 is fixed to a photoconductor driving shaft 53a made of metal and supported rotatably by the holding part 60, and is engaged with a motor gear 51a of the photoconductor motor 51. One end of the photoconductor driving shaft 53a is passed through a bracket 62 and the vibration controlling plate 63, and supported rotatably by the bracket 62. A photoconductor driving coupling 54 is mounted on the other end, and the other end is supported rotatably by the resin housing 61. A photoconductor driven coupling, not illustrated, fixed to an end of the rotating shaft of the photoconductor 10 is coupled to the photoconductor driving coupling 54.

The developing internal gear 55 is supported rotatably by a developing driving pin 55a made of metal and fixed to the resin housing 61, and is engaged with a motor gear 52a of the developing motor 52. The developing internal gear 55 is a molded product that are molded integrally with the developing driven gear 56 that is positioned coaxially with the developing internal gear 55. The developing driven gear 56 is engaged with the developing idler gear 57. The tip of the developing driving pin 55a is fitted into the bracket 62, and is positioned by the bracket 62.

A developing driving coupling 58 is provided to the axial center of the developing idler gear 57. The developing driving coupling 58 is passed through the resin housing 61, and is supported rotatably by the resin housing 61. A developing driven coupling, not illustrated, fixed to an end of the rotating shaft of the developing roller 12a is coupled to the developing driving coupling 58. The developing idler gear 57 and the developing driving coupling 58 are produced as an integrally molded resin product.

The conveying driving gear 71 is also engaged with the motor gear 51a of the photoconductor motor 51. The conveying timing belt 73 is stretched across the conveying driving pulley 72 integrally molded with the conveying driving gear 71 by integral resin molding, and the conveying driven pulley 74 integrally molded with the conveying idler gear 75 by integral resin molding.

The integrally molded resin product including the conveying driving gear 71 and the conveying driving pulley 72 is supported rotatably by a conveying driving pin 72a made of metal and one end of which is fixed to the resin housing 61. The tip of the conveying driving pin 72a is fitted into the bracket 62, and is positioned by the bracket 62. The integrally molded resin product including the conveying idler gear 75 and the conveying driven pulley 74 is supported rotatably by a conveying driven pin 74a made of metal and fixed to the resin housing 61. The tip of the conveying driven pin 74a is fitted into the bracket 62, and is positioned by the bracket 62.

A part of the conveying idler gear 75 is exposed through a side surface opening 61a on the resin housing 61, as illustrated in FIG. 4. A screw driving gear 76 that is fixed to one end of the screw shaft 77a of the waste toner conveying screw is engaged with the conveying idler gear 75, via the side surface opening 61a, as illustrated in FIG. 5.

One end of a grounding plate 65 that is grounded is fixed to the bracket 62 with a screw 83, as illustrated in FIG. 3. One end of a grounding electrode plate 64 is fixed to one end of the photoconductor driving shaft 53a passed through the bracket 62, and the other end of the grounding electrode plate 64 is fixed to the bracket 62 with a screw 82. In this manner, the photoconductor 10 is grounded via the photoconductor driving shaft 53a, the grounding electrode plate 64, the bracket 62, and the grounding plate 65.

Figure 6:
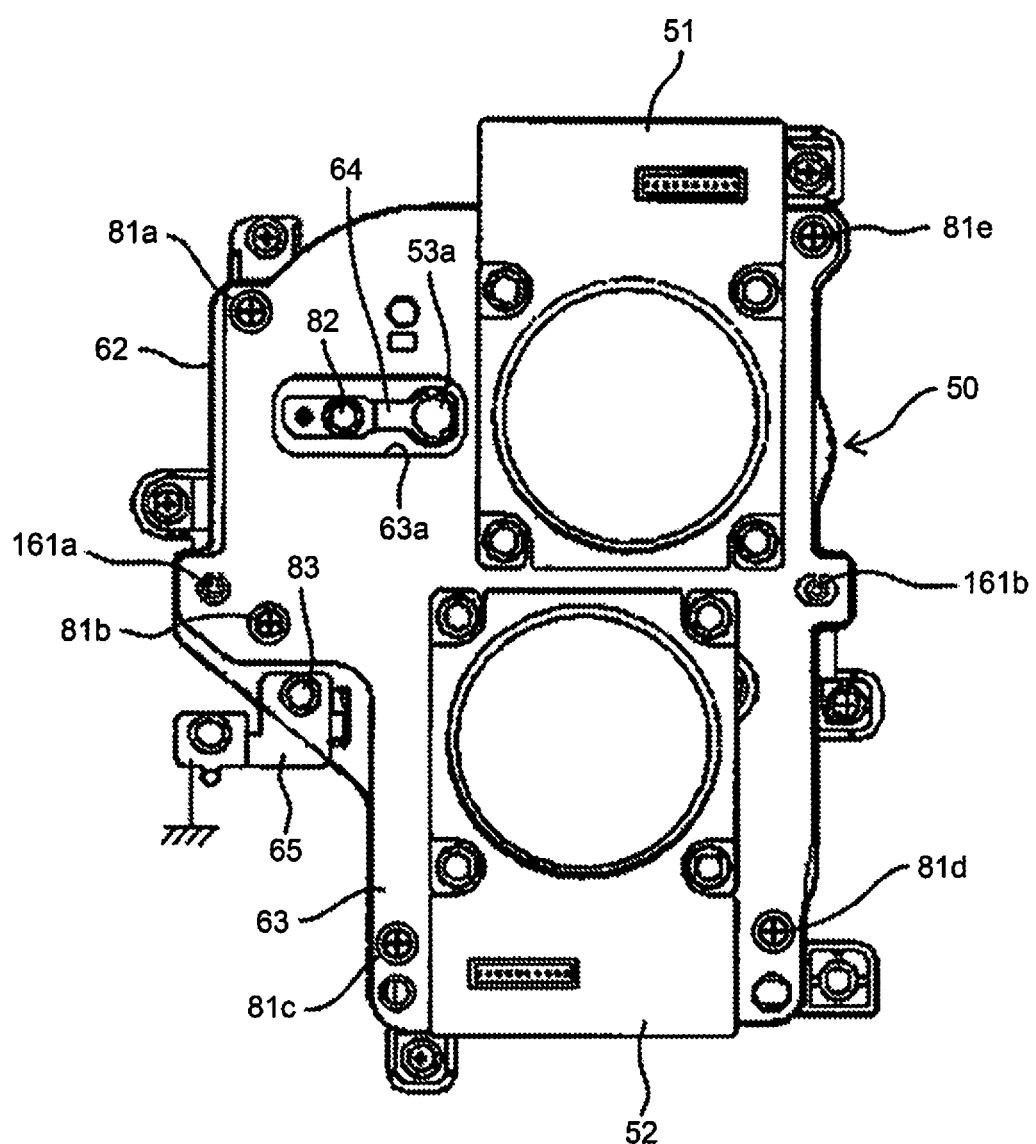
FIG. 6 is a front view of the driving device viewed from the motors.

FIG. 6 is a front view of the driving device 50 viewed from the motors.

As illustrated in FIG. 6, the vibration controlling plate 63 and the bracket 62 are overlapped with each other, and the vibration controlling plate 63 is fixed to the resin housing 61 around the edge of the vibration controlling plate 63 with five screws 81a to 81e, with the bracket 62 interposed between the vibration controlling plate 63 and the resin housing 61. In this manner, the bracket 62 and the vibration controlling plate 63 are partially coupled to each other at the five points 163a to 163e around the edge of the vibration controlling plate 63. The photoconductor motor 51 and the developing motor 52 are fixed to the bracket 62 with screws, with the vibration controlling plate 63 interposed between these motors and the bracket 62.

Positioning protrusions 161a and 161b are provided near the right end and the left end, respectively, of the resin housing 61 in FIG. 3. The integrated object of the bracket 62 and the vibration controlling plate 63 are positioned by these positioning protrusions 161a and 161b, and fixed to the bracket 62 with screws.

Figure 7:
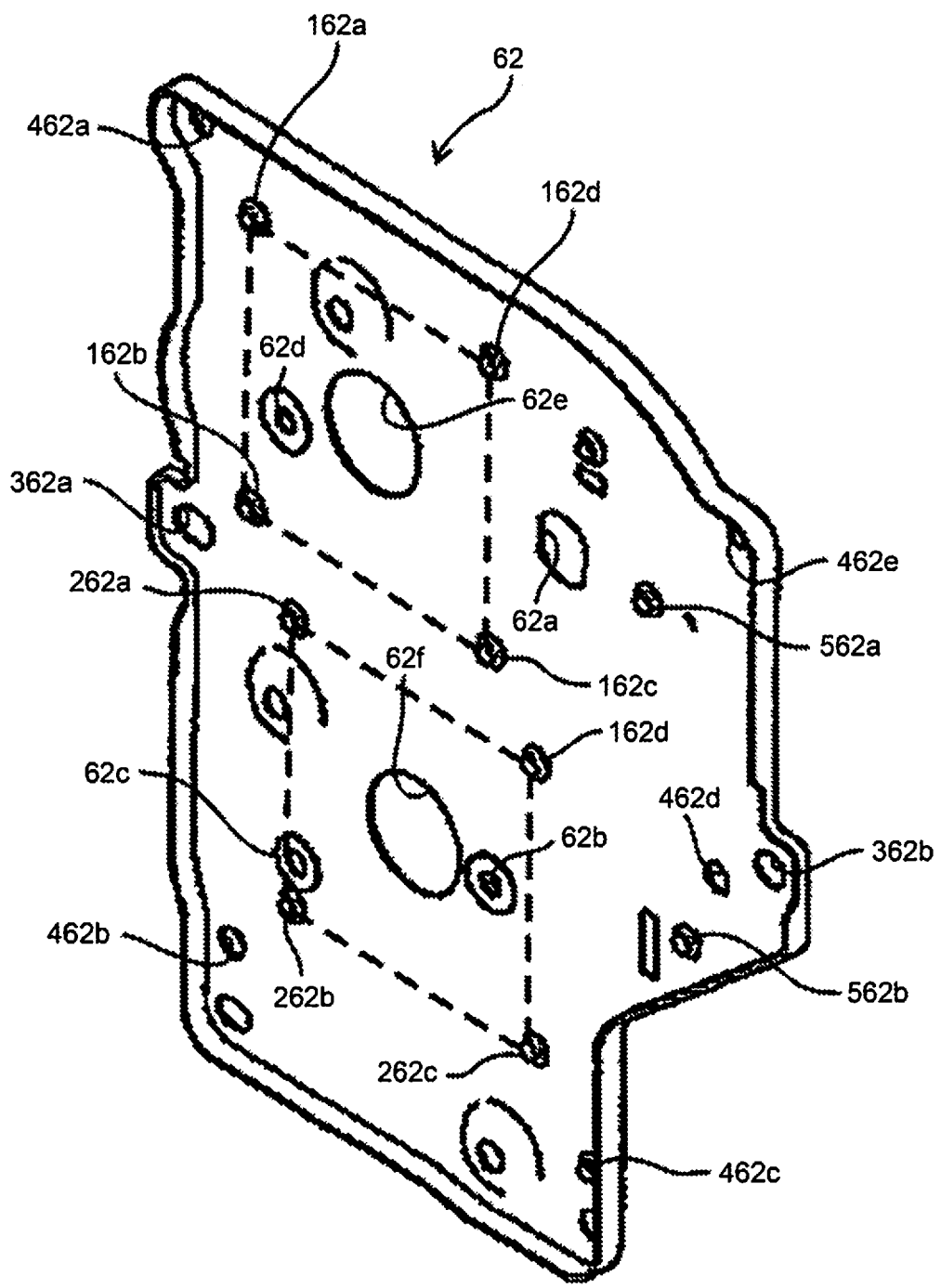
FIG. 7 is a perspective view of a bracket according to an example embodiment.

FIG. 7 is a perspective view of the bracket 62.

The bracket 62 is made of a sheet metal, and the edge of the bracket 62 is bent by 90 degrees toward the resin housing 61. The bracket 62 has screw through holes 462a to 462e, illustrated in FIG. 6, through which the screws 81a to 81e are passed, at five points around the edge. The bracket 62 also has a photoconductor motor screw holes 162a to 162d into which screws for fixing the photoconductor motor 51 are screwed, and developing motor screw holes 262a to 262d into which screws for fixing the developing motor 52 are screwed.

A photoconductor motor gear through hole 62e through which the motor gear 51a of the photoconductor motor 51 is passed is provided at substantially the center of the area surrounded by a dotted line in FIG. 7 connecting the photoconductor motor screw holes 162a to 162d. A developing motor gear through hole 62f through which the motor gear 52a of the developing motor 52 is passed is provided substantially at the center of the area surrounded by a dotted line in FIG. 7 connecting the developing motor screw holes 262a to 262d.

A conveying driving pin positioning hole 62d into and with which the tip of the conveying driving pin 72a is fitted and positioned is provided near the photoconductor motor gear through hole 62e. A developing driving pin positioning hole 62b into and with which the tip of the developing driving pin 55a is fitted and positioned is provided near the developing motor gear through hole 62f. A conveying driven pin positioning hole 62c into and with which the tip of the conveying driven pin 74a is fitted and positioned is provided above the developing motor screw hole 262c in FIG. 7. A photoconductor driving shaft through hole 62a through which the photoconductor driving shaft 53a is passed is provided to the right of the dotted line connecting the photoconductor motor screw holes 162c and 162d in FIG. 7. A screw hole 562a into which the screw 82 for fixing the grounding electrode plate 64 is screwed is provided to the right of the photoconductor driving shaft through hole 62a in FIG. 7. A screw hole 562b through which the screw 83 for fixing the grounding plate is screwed is provided at the right end of the bracket 62 and substantially at the center of the bracket 62 in the vertical direction in FIG. 7. Positioning through holes 362a and 362b through which the positioning protrusions 161a and 161b of the resin housing 61 are passed, respectively, are provided at the right end and the left end, respectively, substantially at the center in the vertical direction in FIG. 7.

Figure 8:
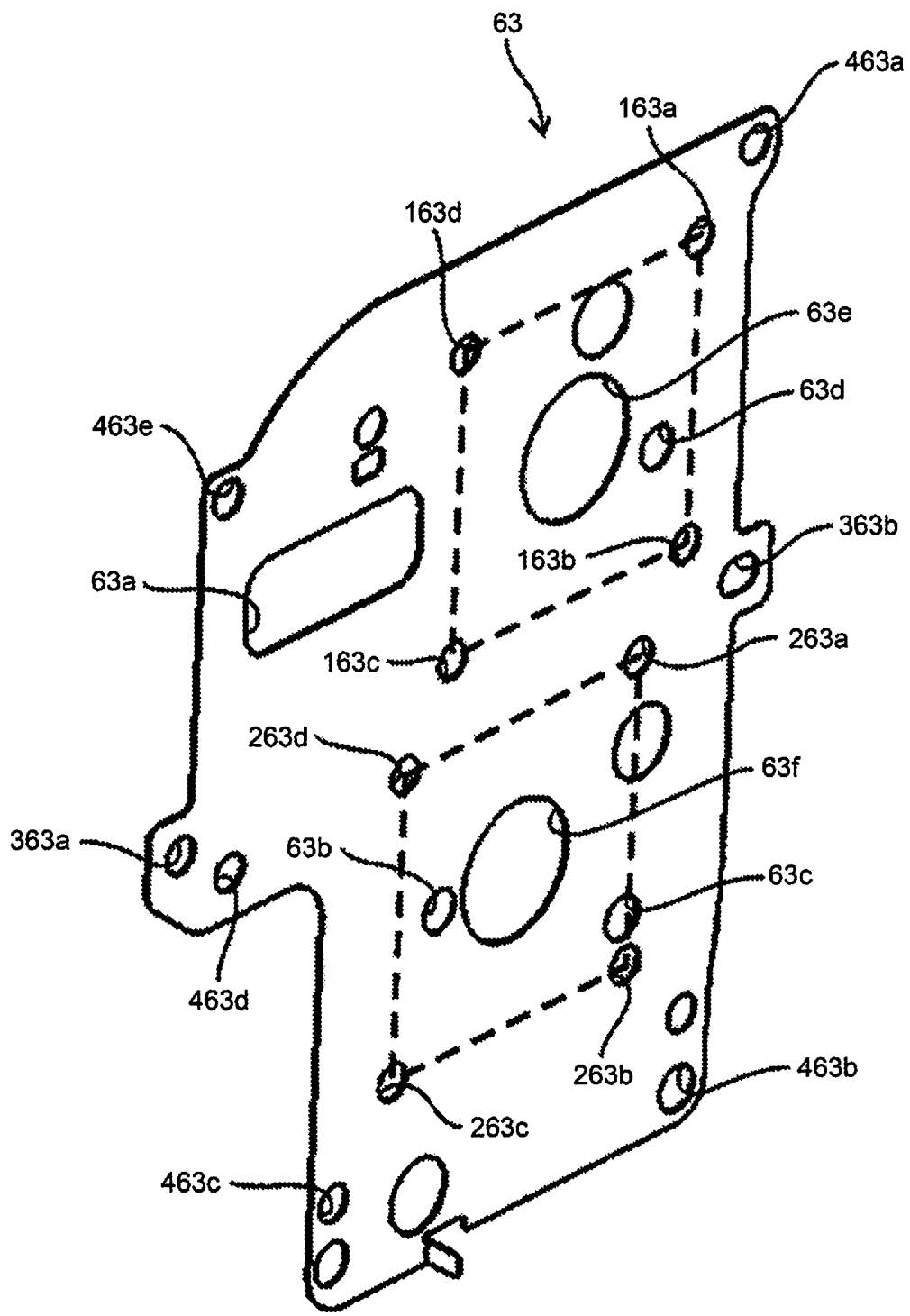
FIG. 8 is a perspective view of a vibration controlling plate according to an example embodiment.

FIG. 8 is a perspective view of the vibration controlling plate 63.

As illustrated in FIG. 8, the vibration controlling plate 63 is made of a sheet metal, and has five screw through holes 463a to 463e through which the screws 81a to 81e are respectively passed. The vibration controlling plate 63 also has photoconductor motor screw through holes 163a to 163d through which the screws for fixing the photoconductor motor 51 are passed, and developing motor screw through holes 263a to 263d through which the screws for fixing the developing motor 52 are passed.

A vibration controlling side photoconductor motor gear through hole 63e through which the motor gear 51a of the photoconductor motor 51 is passed is provided almost at the center of the area surrounded by a dotted line connecting the photoconductor motor screw through holes 163a to 163d in FIG. 8. A vibration controlling side developing motor gear through hole 63f through which the motor gear 52a of the developing motor 52 is passed is provided almost at the center of the area surrounded by a dotted line connecting the developing motor screw holes 262a to 262d in FIG. 8.

A conveying driving pin escape hole 63d for preventing tip of the conveying driving pin 72a from hitting the vibration controlling plate 63 is provided near the vibration controlling side photoconductor motor gear through hole 63e. With this escape hole 63d provided, the tip of the conveying driving pin 72a can be fitted into the conveying driving pin positioning hole 62d reliably. A developing driving pin escape hole 63b for preventing the tip of the developing driving pin 55a from hitting the vibration controlling plate 63 is provided near the developing motor gear through hole 62f. With the developing driving pin escape hole 63b, the tip of the developing driving pin 55a can be fitted into the developing driving pin positioning hole 62b reliably.

A conveying driven pin escape hole 63c for preventing the tip of the conveying driven pin 74a from hitting the vibration controlling plate 63 is provided above the developing motor screw through hole 263c in FIG. 8. In this manner, the tip of the conveying driven pin 74a can be fitted into the conveying driven pin positioning hole 62c reliably. An escape hole 63a for preventing the tip of the photoconductor driving shaft 53a and the grounding electrode plate 64 from hitting the vibration controlling plate 63 is provided to the left of the dotted line connecting the photoconductor motor screw through holes 163c and 163d in FIG. 8. Positioning holes 363a and 363b into which the positioning protrusions 161a and 161b of the resin housing 61 are fitted, respectively, and that position the integrated object of the vibration controlling plate 63 and the bracket 62 are provided at the right end and the left end, respectively, and substantially at the center in the vertical direction in FIG. 8.

The holding part 60 of the driving device 50 holds, as vibrating members, a plurality of drive transmitting members such as the photoconductor gear 53 and the developing internal gear 55, and the photoconductor motor 51 and the developing motor 52. Vibrations of these vibrating members may generate noise, and be transmitted to the photoconductor 10 or the developing roller 12a. Such vibrations may cause the photoconductor 10 or the developing roller 12a to be rotated at an uneven speed, and abnormality such as banding may appear in the resultant image.

Figure 9:
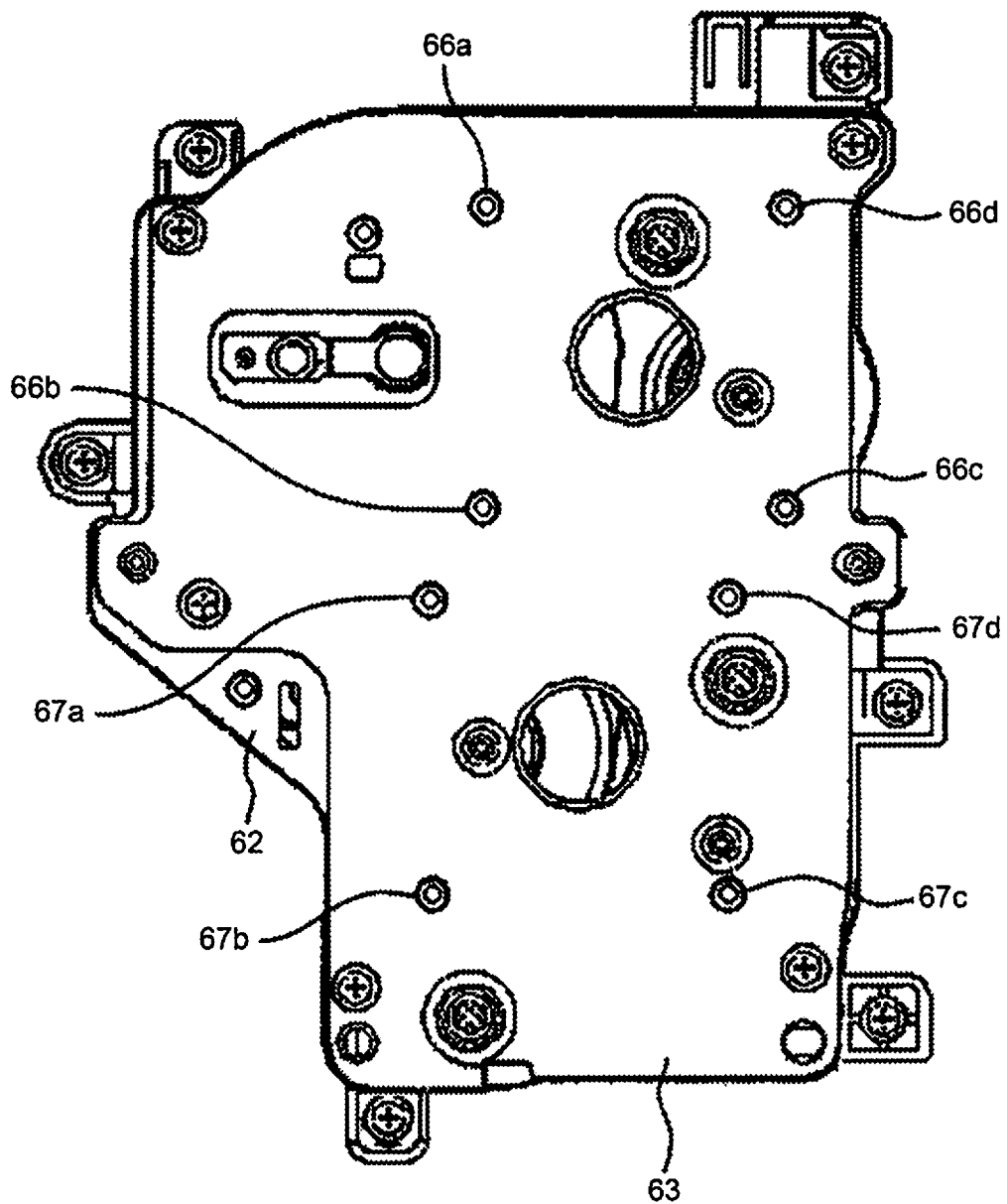
FIG. 9 is a schematic for explaining how the vibrations from a photoconductor motor and a developing motor propagate according to an example embodiment.

FIG. 9 is a schematic for explaining how vibrations from the photoconductor motor 51 and the developing motor 52 propagate.

As illustrated in FIG. 9, the vibration from the photoconductor motor 51 propagates to the vibration controlling plate 63 abutting against the photoconductor motor 51 via four fixing portions 66a to 66d at which the photoconductor motor 51 is fixed. The vibration of the developing motor 52 propagates to the vibration controlling plate 63 abutting against the developing motor 52 via four fixing portions 67a to 67d at which the developing motor 52 is fixed. In this manner, the vibration controlling plate 63 is vibrated by the vibrations of the photoconductor motor 51 and the developing motor 52.

Figure 10:
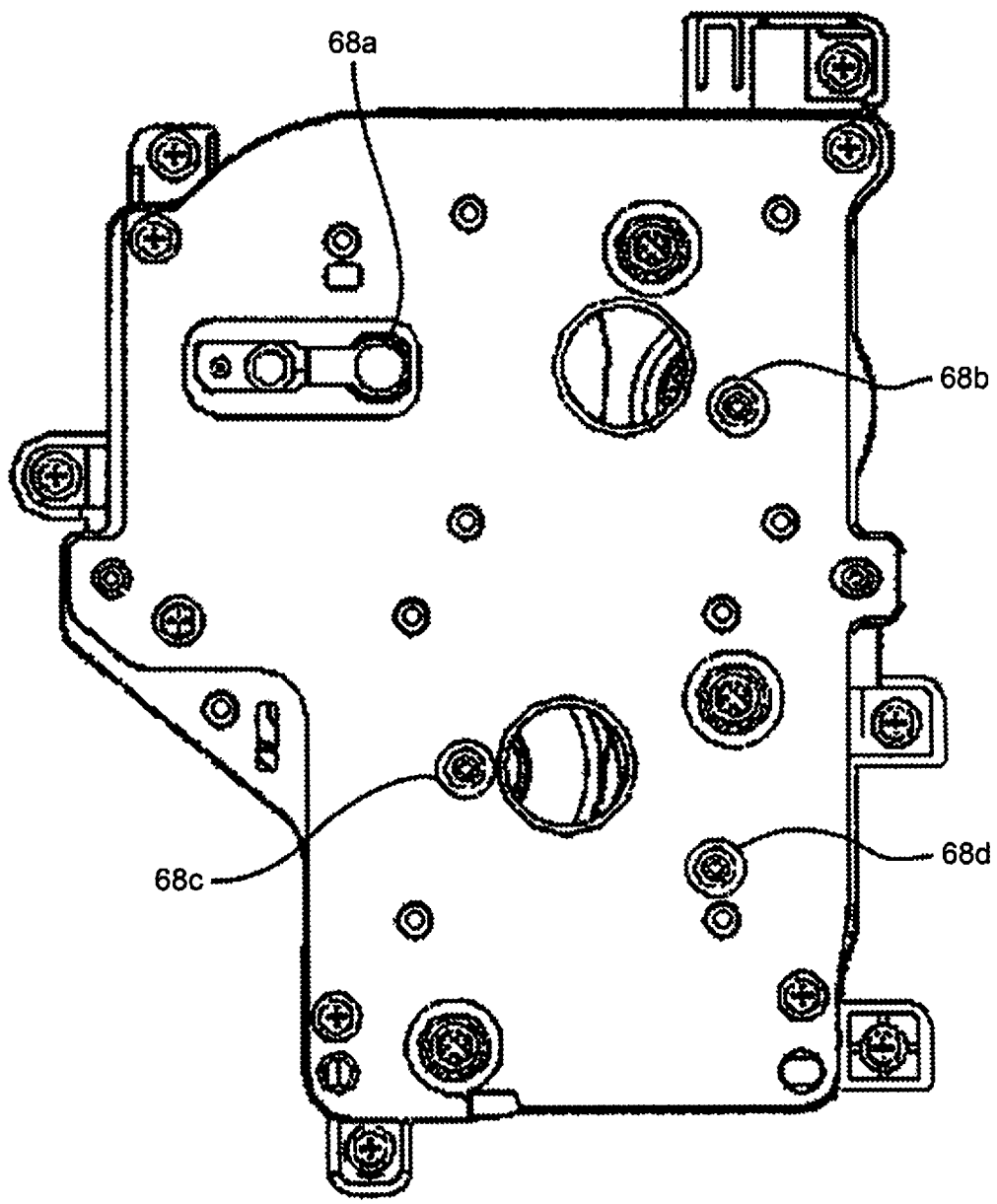
FIG. 10 is a schematic for explaining how the vibrations from gears housed in the resin housing propagate according to an example embodiment.

FIG. 10 is a schematic for explaining how vibrations from the gears housed in the resin housing 61 propagate.

Vibrations generated in a photoconductor driving force transmission path for transmitting a driving force to the photoconductor 10, e.g., at the engagement portion between the motor gear 51a and the photoconductor gear 53 of the photoconductor motor 51, propagates to and vibrates the photoconductor driving shaft 53a. A vibration of the photoconductor driving shaft that is a vibrating member propagates to the bracket 62 via a positioning fitted portion 68a where the photoconductor driving shaft 53a is fitted to the bracket 62.

In a developing driving force transmitting path for transmitting a driving force of the developing motor 52 to the developing roller 12a, vibrations are generated at the engagement portion between the motor gear 52a of the developing motor 52 and the developing internal gear 55, and the engagement portion between the developing driven gear 56 and the developing idler gear 57. These vibrations generated in the developing driving force transmitting path propagate to the developing driving pin 55a, causing the developing driving pin 55a to vibrate, and this vibration propagates to the bracket 62 via a positioning fitted portion 68c where the developing driving pin 55a is fitted to the bracket 62.

In a conveying driving force transmitting path for transmitting the driving force of the photoconductor motor 51 to a waste toner conveying screw not illustrated, vibrations are generated at the engagement portion between the motor gear 51a of the photoconductor motor 51 and the conveying driving gear 71, and the engagement portion between the conveying driving pulley 72 and the conveying timing belt 73. Vibrations are also generated in the engagement portion between the conveying driven pulley 74 and the conveying timing belt 73, and the engagement portion between the conveying idler gear 75 and the screw driving gear 76.

The vibrations generated in the conveying driving force transmitting path cause the conveying driving pin 72a and the conveying driven pin 74a to vibrate, and propagate to the bracket 62 via a positioning fitted portion 68b where the conveying driving pin 72a is fitted to the bracket 62, and via a positioning fitted portion 68d where the conveying driven pin 74a is fitted to the bracket 62.

In the manner described above, the bracket 62 is vibrated by the vibrations of the various drive transmitting members, such as the gears housed in the resin housing 61.

As mentioned earlier, the bracket 62 and the vibration controlling plate 63 are overlapped with each other, and partially coupled at the five locations 81a to 81e around the edge of the vibration controlling plate 63, as illustrated in FIG. 6. This causes the vibration controlling plate 63 and the bracket 62 not to vibrate together but to vibrate independently. Specifically, the vibration controlling plate 63 is vibrated by the vibrations of the photoconductor motor 51 and the developing motor 52, and the bracket 62 is vibrated by the vibrations of the various drive transmitting members such as gears housed in the resin housing 61. The vibration of one of the vibration controlling plate 63 and the bracket 62 interferes with the vibration of the other at locations where the vibration controlling plate 63 and the bracket 62 are partially coupled (five locations 81a to 81e around the edge of the vibration controlling plate 63). By adjusting the rigidity of the vibration controlling plate 63 and the bracket 62, the locations where the vibration controlling plate 63 and the bracket 62 are coupled, and/or the like such that the vibrations of the vibration controlling plate 63 and the vibrations of the bracket 62 have such a phase difference that causes the vibrations to cancel out with each other at the coupled locations, vibrations of the vibration controlling plate 63 and the bracket 62 are reduced.

According to the reduction effect of the vibrations of the two member by the superposition, when the vibration difference between these two members overlapped with each another (the bracket 62 and the vibration controlling plate 63) is small, the vibrations can be cancelled out sufficiently at the partially coupled potions. By contrast, when the vibration difference is larger, the vibration reduction effect, in which the vibrations cancel out each other, is lower. It is therefore preferable to make adjustments so as to make the vibration difference between the bracket 62 and the vibration controlling plate 63 small. For example, the vibration difference can be reduced by adjusting the rigidity of these members. As a way of adjusting the rigidity, the thickness may be adjusted, or a bent portion may be provided.

Figure 11:
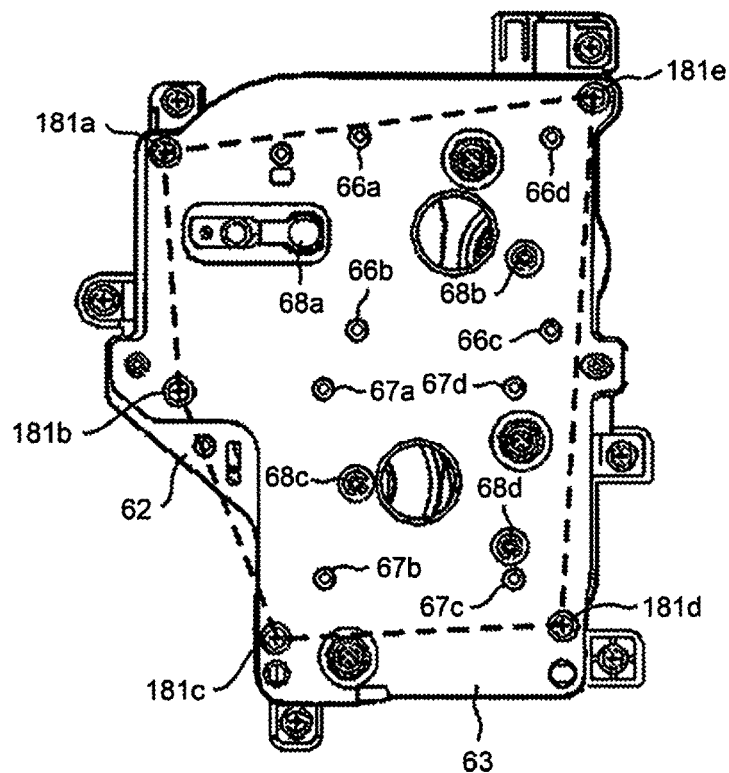
FIG. 11 is a schematic for explaining that the vibration propagating portions are provided inside a polygon formed by connecting partially coupled portions between the bracket and the vibration controlling plate according to an example embodiment.
Figure 12:
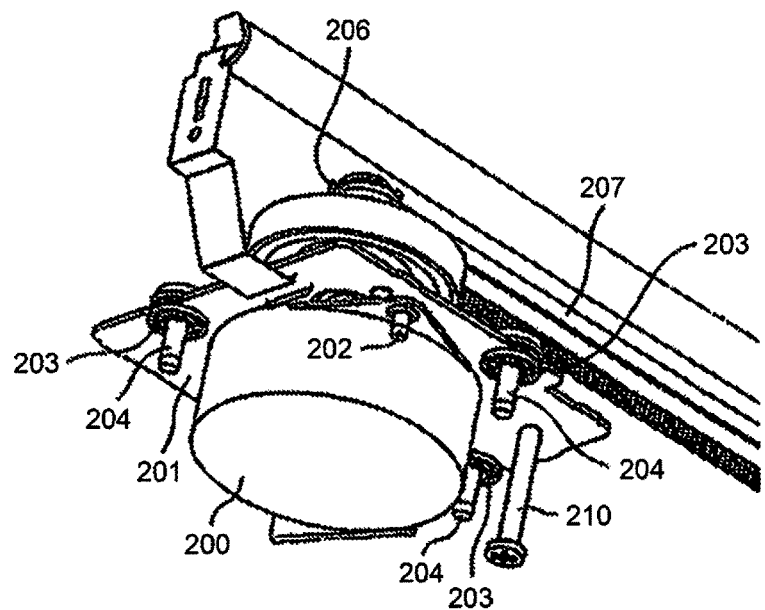
FIG. 12 is a perspective view of a conventional driving device.

As illustrated in FIG. 11, in the embodiment, vibration propagating portions are provided inside a polygon formed by connecting the partially coupled portions 181a to 181e of the bracket 62 and the vibration controlling plate 63 illustrated by a dotted line in FIG. 11. Specifically, the four fixing portions 66a to 66d to which the photoconductor motor 51 is fixed and at which the photoconductor motor 51 that is a vibrating member abuts against the vibration controlling plate 63 are provided inside the polygon drawn by a dotted line in FIG. 11. The four fixing portions 67a to 67d to which the developing motor 52 is fixed and which are portions at which the developing motor 52 that is a vibrating member abuts against the vibration controlling plate 63 are provided inside the polygon drawn in a dotted line in FIG. 11. Similarly, the positioning fitted portion 68a at which the photoconductor driving shaft 53a abuts against the bracket 62, and the positioning fitted portion 68b at which the conveying driven pin 74a abuts against the bracket 62, which are portions at which a vibrating member and the bracket abut against each other are provided inside the polygon drawn in a dotted line in FIG. 11. The positioning fitted portion 68c at which the developing driving pin 55a abuts against the bracket 62, and the positioning fitted portion 68d at which the conveying driven pin 74a abuts against the bracket 62 are also provided inside the polygon drawn by a dotted line in FIG. 11.

In this manner, the vibrations propagated to the bracket 62 and the vibration controlling plate 63 propagate to all of the partially coupled portions 81a to 81d of the bracket 62 and the vibration controlling plate 63, so that the partially coupled portions 181a to 181e can reduce the vibrations. Compared with a configuration in which the vibration propagating portions are provided outside the polygon drawn by connecting the partially coupled portions 181a to 181e, indicated by a dotted line in FIG. 11, the vibrations can be reduced more efficiently, and the vibration control effect can be improved.

Because the holding part 60 holds electric components such as the photoconductor motor 51 and the developing motor 52, the holding part 60 needs to be grounded. To ground the holding part 60, it is necessary to connect the holding part 60 to the bracket 62 or the vibration controlling plate 63 that is provided with a grounding electrode made of metal. In the embodiment, as explained earlier with reference to FIG. 6, the grounding plate 65 is attached to the bracket 62, but not to the vibration controlling plate 63. It is because the bracket 62 is more difficult to vibrate than the vibration controlling plate 63. That is, because the bracket 62 is bent by 90 degrees around the edge, as illustrated in FIG. 7, and therefore is more rigid, the bracket 62 is more difficult to vibrate compared with the vibration controlling plate 63 with no bent portion, as illustrated in FIG. 8. Furthermore, because the edge of the bracket 62 abuts against the resin housing 61, the bracket 62 is more difficult to vibrate compared with the vibration controlling plate 63 having only five locations that are partially coupled.

In this manner, the grounding can be stabilized by connecting the grounding plate 65 to the bracket 62 that is more difficult to vibrate, compared with when the grounding plate 65 is connected to the vibration controlling plate 63 is easy to vibrate. As a result, adverse effects to the operations of the photoconductor motor 51 and the developing motor 52 can be suppressed further, compared with when the grounding plate 65 is connected to the vibration controlling plate 63.

Furthermore, in the embodiment, the photoconductor 10 is grounded via the bracket 62. This can prevent an increase in the number of parts, compared with when the photoconductor motor 51, the developing motor 52 and the photoconductor 10 are grounded separately from each other.

Explained above are merely exemplary, and the present invention achieves advantageous effects that are specific to the following respective aspects.

Aspect 1

A driving device includes: a plurality of vibrating members that vibrate when the vibrating members are driven (in the embodiment, corresponding to, for example, the photoconductor motor 51, the developing motor 52, the photoconductor driving shaft 53a, the developing driving pin 55a, the conveying driving pin 72a, and the conveying driven pin 74a); and a holding part 60 that holds the vibrating members. The holding part 60 includes a first member such as the bracket 62 with which one or more of the vibrating members are brought into contact, and a second member such as the vibration controlling plate 63 with which one or more of the vibrating members are brought into contact. The first member and the second member are partially coupled to each other. A grounding member such as the grounding plate 65 for electrically grounding a member held by the holding part is brought into contact with one of the first member and the second member that is more difficult to vibrate.

In the driving device according to Aspect 1, because the first member and the second member are only partially coupled, the first member and the second member vibrate independently when these members receive the vibrations propagated from the vibrating members that are in contact with the first member and the second member, and the vibration of one of the first member and the second member interferes with the vibration of the other at the coupled locations. The vibrations of the first member and the second member can therefore be reduced by adjusting the rigidity of the members, the coupled locations, the locations where these members are brought into contact with the vibrating members, and/or the like in such a manner that the vibration of the first member and that of the second member has such a phase difference that reduces the vibrations of these members. Based on the above, the vibrations can be reduced with a simple approach of partially coupling the first member to the second member, and vibrations can be controlled and noise can be reduced in the entire driving device.

Furthermore, according to Aspect 1, the grounding member for electrically grounding a member (in the embodiment, for example, the photoconductor driving shaft 53a, the photoconductor motor 51, and the developing motor 52) held by the holding part is brought into contact with one of the first member and the second member that is more difficult to vibrate. With this, electrical grounding is stabilized more compared with when the grounding member is brought into contact with the member that vibrates more. Therefore, the effect to the operations of electric components such as the photoconductor motor 51 and the developing motor 52 can be suppressed.

Aspect 2

In the driving device 50 according to Aspect 1, the holding part 60 includes a housing such as the resin housing 61 for housing one or more of the vibrating members. The first member such as the bracket 62 abuts against the housing. The grounding member such as the grounding plate 65 is brought into contact with the first member.

With such a configuration, the first member such as the bracket 62 abutting against the housing such as the resin housing 61 is more difficult to vibrate, compared with the second member such as the vibration controlling plate 63 that is partially coupled to the first member, as explained in the embodiment. Therefore, by bringing the grounding member such as the grounding plate 65 into contact with the first member, reliable grounding can be performed, compared with when the grounding member is brought into contact with the second member.

Aspect 3

In the driving device according to Aspect 1 or Aspect 2, a plurality of members (in the embodiment, the photoconductor motor 51, the developing motor 52, and the photoconductor 10) are grounded via one of the first member and the second member that is grounded to the grounding member.

With this, compared with when each of these members is grounded separately, the number of parts can be reduced, and the costs of the apparatus can be reduced.

Aspect 4

In the driving device according to any one of Aspect 1 to Aspect 3, the first member such as the bracket 62 and the second member such as the vibration controlling plate 63 are overlapped with each other.

According to Aspect 4, the size of the driving device can be reduced, compared with when the first member and the second member are not overlapped with each other.

Aspect 5

In the driving device according to Aspect 4, the first member and the second member are coupled at three or more coupled portions, and the vibrating members abut against the first member and the second member inside a polygon formed by connecting the coupled portions.

With such a configuration, vibrations of the vibrating members transmitted from the abutment portions with the vibrating members propagate to the coupled portions surrounding the abutment portions. The coupled portions can then serve to reduce the vibrations of the vibrating members transmitted via the abutment portions. The vibrations of the members can therefore be reduced efficiently.

Aspect 6

A driving device includes: a plurality of vibrating members that vibrate when the vibrating members are driven (in the embodiment, corresponding to, for example, the photoconductor motor 51, the developing motor 52, the photoconductor driving shaft 53a, the developing driving pin 55a, the conveying driving pin 72a, and the conveying driven pin 74a); and a holding part 60 that holds the vibrating members. The holding part 60 includes a first member such as the bracket 62 and a second member such as the vibration controlling plate 63 with which at least one or more of the vibrating members are brought into contact. The first member and the second member are overlapped with each other, and are partially coupled to each other. The first member and the second member are coupled at three or more coupled portions. The vibrating members abut against the first member and the second member inside a polygon formed by connecting the coupled portions.

In the driving device according to Aspect 6, because the first member and the second member are only partially coupled, the first member and the second member vibrate independently when these members receive the vibrations propagated from the vibrating members that are in contact with the first member and the second member.

Because the vibration of one of the first member and the second member interferes with the vibration of the other at the coupled locations, the vibrations of the first member and the second member can be reduced by adjusting the rigidity of the members, the coupled locations, the locations where these members are brought into contact with the vibrating members and/or the liked in such a manner that the vibration of the first member and that of the second member has such a phase difference that reduces the vibrations of these members. Based on the above, the vibrations can be reduced with a simple approach of partially coupling the first member to the second member, and vibrations can be controlled and noise can be reduced in the entire driving device. Furthermore, because the vibration of the first member interferes with that of the second member at the coupled portions of the first member and the second member, by bringing the vibrating members into contact with the first member and the second member inside the polygon formed by connecting the coupled portions of the first member and the second member, the vibrations of the vibrating members transmitted via the locations abutting against the vibrating members propagate to the coupled portions surrounding the abutment portions. The coupled portions can then serve to reduce the vibrations of the vibrating members transmitted via the abutment. The vibrations of the members can therefore be reduced efficiently.

Aspect 7

An image forming apparatus includes the driving device 50 according to any one of Aspect 1 to Aspect 6.

With this, an image forming apparatus with low noise can be provided, and abnormality such as banding resulting from vibrations of the driving device 50 in the resultant image can be reduced.

According to an embodiment, it is possible to cope with the noise in a manner easy and different from those in Japanese Patent Application Laid-open No. 2009-164668 and Japanese Patent Application Laid-open No. 2007-3964.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A driving device comprising:
    a driving source;
    a drive transmitting member configured to transmit driving force from the driving source to a driven body;
    a housing that houses the drive transmitting member in a recess of the housing;
    a first member disposed on an opening side of the recess of the housing;
    a second member disposed opposite the housing across the first member, wherein the driving source is disposed opposite the first member across the second member; and
    a first grounding member for electrically grounding the driven body and a second grounding member for electrically grounding at least the driving source are provided in the first member,
    wherein the first member has a shape that is more difficult to vibrate than the second member.

2. The driving device according to claim 1, wherein the first member includes a wall protruding toward a position facing an outer side of a sidewall of the housing.

3. The driving device according to claim 1, wherein the second member includes a plate member.

4. The driving device according to claim 1, wherein
    the housing is made of resin, and
    the first member and the second member are made of metal.

5. The driving device according to claim 1, wherein at least two of the driving source, the drive transmitting member, and the driven body are grounded via the first member.

6. The driving device according to claim 1, wherein
    the first member and the second member each include a first through hole through which a first fixing member fixing the first member and the second member to the housing extends, and
    a relative position between the first member and the second member is fixed at a fixing portion by the first fixing member extending through the first through hole of the first member and the first through hole of the second member to be fastened to the housing.

7. The driving device according to claim 1, wherein the second member includes a second through hole through which a second fixing member fixing the driving source to the first member extends, the driving source and the second member abut against each other based on the second fixing member being fastened to the first member.

8. The driving device according to claim 1, wherein the first grounding member is a grounding plate.

9. An image forming apparatus comprising the driving device according to claim 1.

10. A driving device, comprising:
a driving source;
a drive transmitting member configured to transmit driving force from the driving source to a driven body;
a housing that houses the drive transmitting member in a recess of the housing;
a first member disposed on an opening side of the recess of the housing;
a second member disposed opposite the housing across the first member, wherein the driving source is disposed opposite the first member across the second member; and
a first grounding member for electrically grounding the driven body and a second grounding member for electrically grounding at least the driving source are provided in the first member,
wherein the first member and the second member each include a first through hole through which a first fixing member fixing the first member and the second member to the housing extends,
wherein a relative position between the first member and the second member is fixed at a fixing portion by the first fixing member extending through the first through hole of the first member and the first through hole of the second member to be fastened to the housing,
wherein the first member and the second member are coupled at three or more fixing portions, and
wherein, inside a polygon defined by the three or more fixing portions,
the driving source abuts against the second member, and
at least one supporting member supporting the drive transmitting member or at least one shaft of the driven body abuts against the first member.

11. An image forming apparatus comprising the driving device according to claim 10.

12. A driving device, comprising:
a driving source;
a drive transmitting member configured to transmit driving force from the driving source to a driven body;
a housing member housing the drive transmitting member; and
a first member and a second member between the driving source and the housing member,
wherein
the first member and the second member each include at least three through holes through which separate, respective fixing members fixing the first member and the second member to the housing member extend, and a relative position between the first member and the second member is fixed at separate fixing portion of three or more fixing portions by a fixing member of the separate, respective fixing members extending through one through hole of the first member and one through hole of the second member to be fastened to the housing member, and
inside a polygon defined by the three or more fixing portions,
the driving source abuts against the second member, and
at least one supporting member supporting the drive transmitting member or at least one shaft of the driven body abuts against the first member.

13. An image forming apparatus comprising the driving device according to claim 12.

* * * * *